Patented Aug. 16, 1932

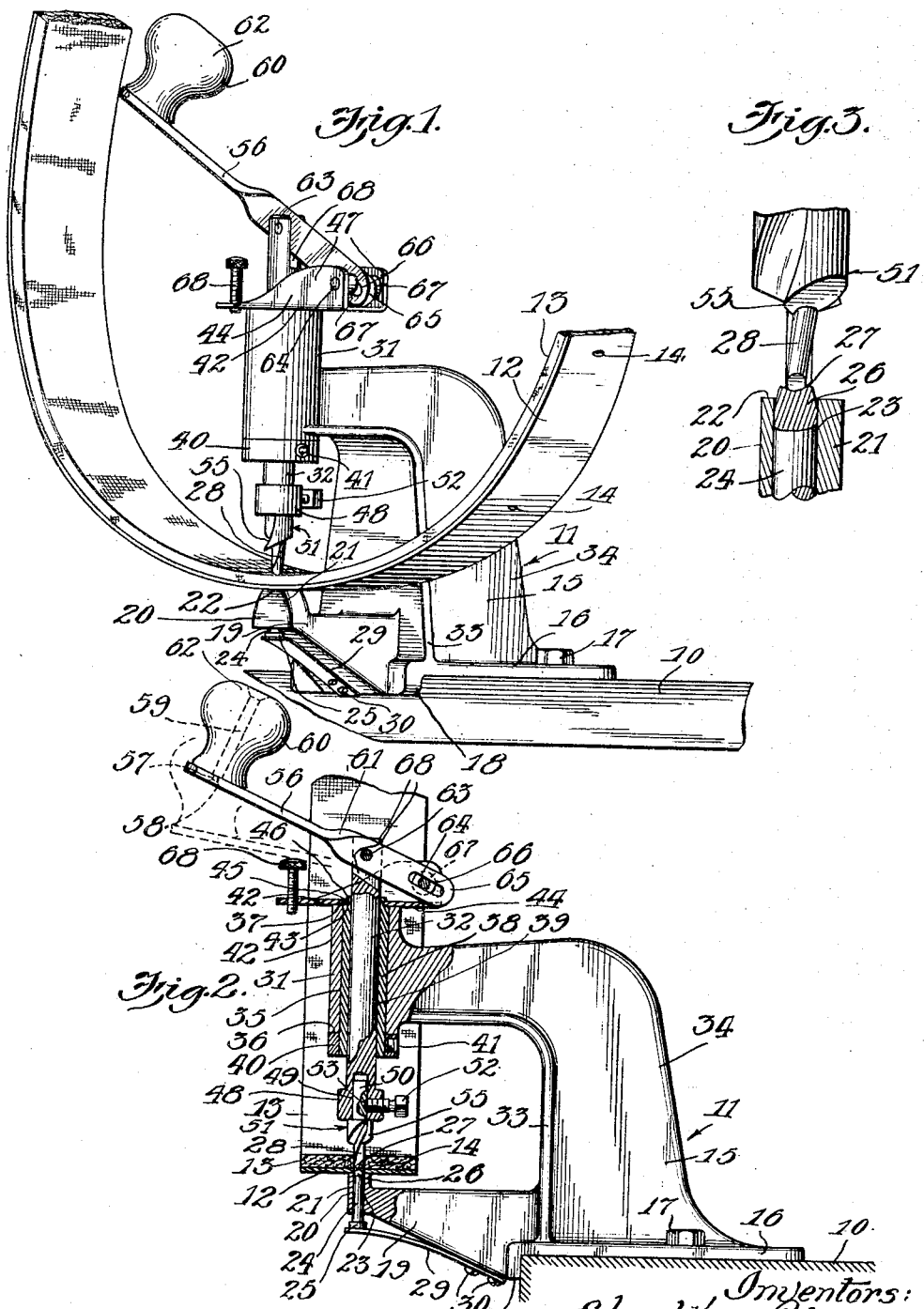

1,872,493

UNITED STATES PATENT OFFICE

EDWARD HENRY PETERSON AND WILLIAM H. ODLUM, OF CHICAGO, ILLINOIS, ASSIGNORS TO DURO METAL PRODUCTS COMPANY, OF CHICAGO, ILLINOIS, A CORPORATION OF ILLINOIS

BRAKE LINING TOOL

Application filed August 22, 1930. Serial No. 477,177.

The present invention relates to brake lining tools and is particularly concerned with tools for the purpose of drilling and countersinking brake linings, for relining the brakes of automotive vehicles or the like.

The tool is of general application, however, and is adapted to be used wherever it is desirable to drill and countersink linings or other materials.

One of the objects of the present invention is the provision of an improved hand tool for drilling and countersinking brake linings to facilitate the relining of brakes.

Another object is to provision of a hand tool of the class described, which is simple and sturdy, and which may be very economically manufactured, thus placing the tool within the means of a large number of purchasers.

Another object is the provision of a device of the class described, having an improved and simplified mechanism many of the parts of which lend themselves readily to manufacture by stamping or casting operations.

Another object is the provision of a brake lining tool of the class described, having an improved and simplified hand actuating mechanism which does not interfere with brake bands of the conventional shape, and which enables the accomplishment of the drilling and countersinking operation very efficiently and expeditiously.

Another object is the provision of an improved bearing for the drill arbor of a tool of the class described, by means of which the drill is mounted for rotation and reciprocation by hand, provision being made for force multiplying devices to secure the desired drill pressure.

Other objects and advantages of the invention will be apparent from the following description and from the accompanying drawing, in which similar characters of reference indicate similar parts throughout the several views.

Referring to the single sheet of drawing

Fig. 1 is a view in perspective of a brake lining tool constructed according to the present invention, with the parts in the position which they assume at the beginning of the drilling operation;

Fig. 2 is an elevational view in partial section, on a vertical plane showing the details of the structure of the bearing for the drill arbor and the actuating mechanism;

Fig. 3 is an enlarged sectional view of the drill and pilot member shown in Fig. 2.

Referring to the drawing, 10 indicates a work table bench or other supporting member for the tool, which is indicated in its entirety by the numeral 11, and which is illustrated in connection with an ordinary brake band 12 to which a lining 13 is to be secured.

The brake band 12 is usually provided with apertures 14 for the rivets which secure the lining 13 to the band, and the present tool is particularly adapted to effect the drilling and countersinking of the lining 13 providing apertures which are in registration with the holes 14 in the brake band 12.

The tool 11 preferably includes a supporting body 15 having an attaching flange 16 which may be secured to the bench 10 by a plurality of screw bolts 17, or other convenient fastening means.

The body is also preferably provided with a downwardly extending flange 18 for engaging the forward edge of the bench 10 and reinforcing the securement of the body 15 on bench 10 and the body is preferably provided with a forwardly extending work supporting shoe 19. The work supporting shoe 19 may be of any convenient shape, but is preferably tapered toward its outer end 20, where it is provided with an upwardly projecting anvil 21 having an upper flat surface 22 for engaging the rear side of the brake band 12, and the shoe 19 is preferably provided with a vertically extending bore 23 for slidably receiving a pilot pin 24.

The pilot pin 24 comprises an elongated cylindrical member having a head 25 and having a substantially frusto-conical tapered end 26. The end surface 27 may be substantially flat or slightly concave for receiving the end of the drill point 28, which is of substantially the same size or smaller than the pin 24, so that the drill point 28 is adapted to be received in the bore 23.

A leaf spring 29 may be secured to the lower side of the shoe 19 by a plurality of screw bolts 30 and leaf spring 29 resiliently engages the head 25 of pilot pin 24 and maintains the pilot pin in the position of Fig. 1 or Fig. 2, in which the pin 24 projects into the aperture 14 in the band 12.

The supporting body 15 is preferably formed with an upwardly and forwardly extending yoke which supports a vertically extending cylindrical bearing 31 for slidably and rotatably mounting the drill arbor 32. The body 15 preferably has a substantially flat, laterally projecting flange 33 at the forward edge of its yoke, and the body 15 is preferably provided with a rearwardly and upwardly projecting flange 34 centrally located with respect to the flange 33 and at right angles to the flange 33, thereby providing a supporting body of maximum strength with a minimum of weight and material.

The bearing 31 is preferably provided with a vertically extending substantially cylindrical bore 35 and with substantially flat thrust bearing surfaces 36 and 37 at each end. The bore 35 rotatably supports a bearing sleeve 38 which is provided with an axially extending bore 39 for slidably supporting the arbor 32.

The bearing sleeve 38 may be provided with a thrust bearing at its lower end, comprising a collar 40 secured to the bearing sleeve by a set screw 41 and at its upper end, the bearing sleeve 38 is reduced in diameter to form an annular shoulder 42 and a reduced portion 43. The bearing sleeve 38 is preferably also provided with a thrust bearing member 44 which may comprise a sheet metal member having a centrally located bore 45 for receiving the reduced portion 43 of sleeve 38. The thrust bearing plate 42 is secured on sleeve 38 by turning over the end of sleeve 38 at 46 and the thrust bearing plate 42 is preferably provided with a pair of upwardly projecting flanges 47.

The drill arbor 32 comprises a substantially cylindrical metal member of tool steel or the like, which is formed at its lower end with an annular enlargement 48, which is provided with an axial bore 49 forming a socket for the shank 50 of the tool, indicated in its entirety at 51. The enlargement 48 is preferably provided with a set screw 52 and the shank 50 with a depression 53, adapted to register with set screw 52 when the annular shoulder 54 on tool 51 is in engagement with the end of arbor 32.

The tool 51 preferably consists of a combined drill and countersink formed with a drill point 28 and with a countersink 55 appropriate for use in countersinking brake linings 13; the countersink 55 coming into play when the drill point 28 has penetrated the brake lining to a sufficient degree.

The tool arbor 32 is preferably provided with force multiplying means for moving the arbor axially to secure the desired drill pressure and with a hand actuating device for rotating the combined drill and countersink, consisting of a crank lever 56. The crank lever 56 may consist of an elongated strip of stock metal which is provided with an aperture 57 at one end for receiving the reduced end 58 of a crank pivot bolt 59. The crank pivot bolt rotatably supports a knob 60 and the crank pivot bolt is preferably riveted to crank lever 56 in such manner that the knob 60 rotates freely.

The crank lever 56 is preferably provided with a 90° twist 61 between its ends so as to cause the knob 60 to extend upward, so that the upper rounded surface 62 of the knob 60 may be used to press the crank lever 56 downward most conveniently and provide the desired tool pressure at the drill point 28.

The drill arbor 32 is preferably formed with an axially extending slot 68 at its upper end, of sufficient width to receive the crank lever 56, which is preferably pivoted to the drill arbor 32 by a rivet 63. The upwardly extending flanges 47 preferably support a transverse pin 64 riveted over on the outside of each flange for pivotally supporting the end 65 of crank lever 56, which is preferably provided with a slot 66.

It should be understood that a slot may either be provided at the rivet 64 or the rivet 63 in order that the crank lever 56 may reciprocate tool arbor 32 to feed the drill and countersink. The pin 64 is also preferably provided with a pair of spacers 67, one on each side of crank lever 56, for engaging the flanges 47 and maintaining the crank 56 in proper position on pin 64.

The thrust bearing 42 is also preferably provided with an adjustable stop screw 68 threaded into the body of thrust bearing 42 and projected upward to engage the crank lever 56. The length of the crank lever 56 is preferably such that the crank may be rotated inside any ordinary conventional brake band 12 so that crank lever 56 does not interfere with ordinary brake bands, and a very convenient yet simple actuating mechanism is provided by the arrangement which was just described.

The operation of the present tool and its actuating mechanism is as follows.

The brake band 12 is placed upon the anvil 21 with the pilot pin 24 projecting in one of the apertures 14 in the brake band, the lining 13 having been previously located in the desired position on the band. The band will then be held with its aperture 14 in proper registry with the drill point 28, and by pressing downward on the knob 60 and rotating the crank 56 at the same time, the drill point 28 may be caused to progress through the lining 13.

During this operation, the crank lever 56 causes the drill arbor 32 to slide in its bearing sleeve 38, the crank 56 exerting a downward pressure on arbor 38 and reacting upwardly against the pin 64. The thrust bearing 40 on the bearing sleeve 38 reacts against bearing 31 in order to permit crank lever 56 to feed the drill point 28 downward.

The crank 56 is secured to the bearing sleeve 28 at the pin 63 and the pin 64 so that crank 56 rotates the body 42, bearing sleeve 38 and drill arbor 42 and the excess length of crank 56 between knob 60 and pin 63 makes the crank a force multiplying device for exerting a considerable axial pressure on the tool 51.

When the drill point 28 has penetrated lining 13 the drill point engages pilot pin 24 and the pilot pin 24 is forced downward against the pressure of leaf spring 29, which slidably engages head 25. The pilot pin 24 recedes sufficiently so that the countersink 55 is fed into engagement with the lining 13 and the lining 13 is appropriately countersunk at the same time by merely continuing the operation until crank lever 56 strikes the stop screw 68.

It will thus be observed that we have invented a very simple, yet efficient brake lining tool which may be very economically manufactured and assembled, but which is capable of use with ordinary brake bands and linings for drilling and countersinking the linings very expeditiously.

The present actuating mechanism is very simple, yet it is also very effective, and the tool may be manufactured in large quantities at a cost which brings it within the means of a vast number of purchasers, such as mechanics who operate on a small scale and cannot therefore afford to purchase expensive machinery.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim is new and desire to secure by Letters Patent of the United States, is:

1. In a brake lining tool, the combination of a supporting body having a work supporting foot and a bearing located above said foot, with a sleeve rotatably mounted in said bearing and provided with thrust bearings at each end of said sleeve to prevent its axial movement relative to the bearing, a tool supporting arbor slidably mounted in said sleeve and rotatable therewith, a crank having a pivot connection with said arbor and said sleeve for rotating and reciprocating said arbor, a combined drill and countersink carried by said arbor, and a pilot pin slidably and resiliently mounted in said foot to be engaged and reciprocated by said drill.

2. In a brake lining tool, the combination of a supporting body having a work supporting foot and a bearing located above said foot, with a sleeve rotatably mounted in said foot, with a sleeve rotatably mounted in said foot, with a sleeve rotatably mounted in said bearing and provided with thrust bearings at each end of said sleeve, one of said thrust bearings having axially extending flanges, a pin carried by said flanges, a crank pivotally connected to said pin and to said arbor to rotate and reciprocate said arbor, an adjustable stop screw carried by said upper thrust bearing for engaging said crank and limiting its downward movement, said arbor having an axial bore and a set screw, and a combined drill and countersink secured in said bore by said set screw, a combined drill and countersink carried by said arbor, and a pilot pin slidably and resiliently mounted in said foot to be engaged and reciprocated by said drill, a head on the lower end of said pin and a leaf spring for resiliently and slidably engaging said head, carried by said foot.

3. In a brake lining tool the combination of a supporting head having a bearing with a sleeve rotatably mounted in said bearing, a bracket carried by the upper end of said sleeve and having a pair of upwardly extending flanges, a pivot pin carried by said flanges, an arbor slidably mounted in said sleeve and having a slot in its upper end, a combined drill and countersink carried by said arbor, a crank arm pivotally connected to said arbor in said slot and having a pivotal and sliding connection with said pin whereby said combined drill and countersink may be rotated and forced downward by means of said crank, a foot carried by said head for supporting a brake band, and a resiliently mounted pilot pin in said foot.

4. In a brake lining tool the combination of a body member having a bearing with a sleeve journaled therein and held against axial movement relative to its bearing, a tool supporting mandrel reciprocably mounted in said sleeve, a lever pivoted intermediate its ends to the upper end of said mandrel thereby to provide for rotation and reciprocation of the mandrel, a bracket secured to the upper end of said sleeve and having a pair of spaced vertically extending flanges, a pin, projecting through an aperture in one end of said lever, and having its ends secured to said flanges, and an adjustable stop screw carried by said bracket for engaging said lever to limit the downward movement of said mandrel.

In witness whereof, we hereunto subscribe our names this 15th day of August, 1930.

EDWARD HENRY PETERSON.
WILLIAM H. ODLUM.